United States Patent [19]

van der Merwe et al.

[11] Patent Number: 4,694,577

[45] Date of Patent: Sep. 22, 1987

[54] SELF-PROPELLED, SELF-STEERED VEHICLE FOR POWER DRIVEN PLANT TRIMMING TOOLS

[76] Inventors: Jacobus C. van der Merwe; Lucas C. van der Merwe, both of 801 Beechwood Dr., Kingsport, Tenn. 37663

[21] Appl. No.: 886,801

[22] Filed: Jul. 18, 1986

[51] Int. Cl.⁴ .............................................. B23D 45/20
[52] U.S. Cl. ..................................... 30/379.5; 56/234; 280/776
[58] Field of Search ...................... 280/776; 104/244.1; 30/180, 379.5, 296 R, 228; 56/233, 234, 328 R, 39

[56] References Cited

U.S. PATENT DOCUMENTS

| | | | |
|---|---|---|---|
| 1,723,073 | 8/1929 | Poll | 104/244.1 |
| 2,228,635 | 1/1941 | Magennis | 30/228 |
| 3,517,496 | 6/1970 | Kemp | 56/328 R |
| 3,834,020 | 9/1974 | Caire | 30/228 |

FOREIGN PATENT DOCUMENTS 698437 10/1953 United Kingdom .................. 56/233

*Primary Examiner*—E. R. Kazenske
*Assistant Examiner*—Willmon Fridie, Jr.
*Attorney, Agent, or Firm*—Fleit, Jacobson, Cohn & Price

[57] ABSTRACT

A self-propelled, self-steered vehicle for carrying a source of pressurized fluid to power and operate a plurality of manually controlled trimming tools for trimming plants in a cultivated field. The vehicle has a steering device that includes a pilot wheel that follows a pre-formed furrow, and that causes movement of a steered wheel to follow lateral deviations of the furrow and thereby steer the unit therealong. The vehicle draws a trailer that carries a supporting structure including a vertically telescopic boom and a pair of transversely extending telescopic arms that support a plurality of coiled branch conduits that communicate with an air compressor carried by the vehicle and that terminate in suitable connectors. The conduits provide compressed air to the respective trimming tools at transversely spaced positions relative to the vehicle, to permit a plurality of trimmer tool operators to simultaneously trim a plurality of plants or trees.

11 Claims, 7 Drawing Figures

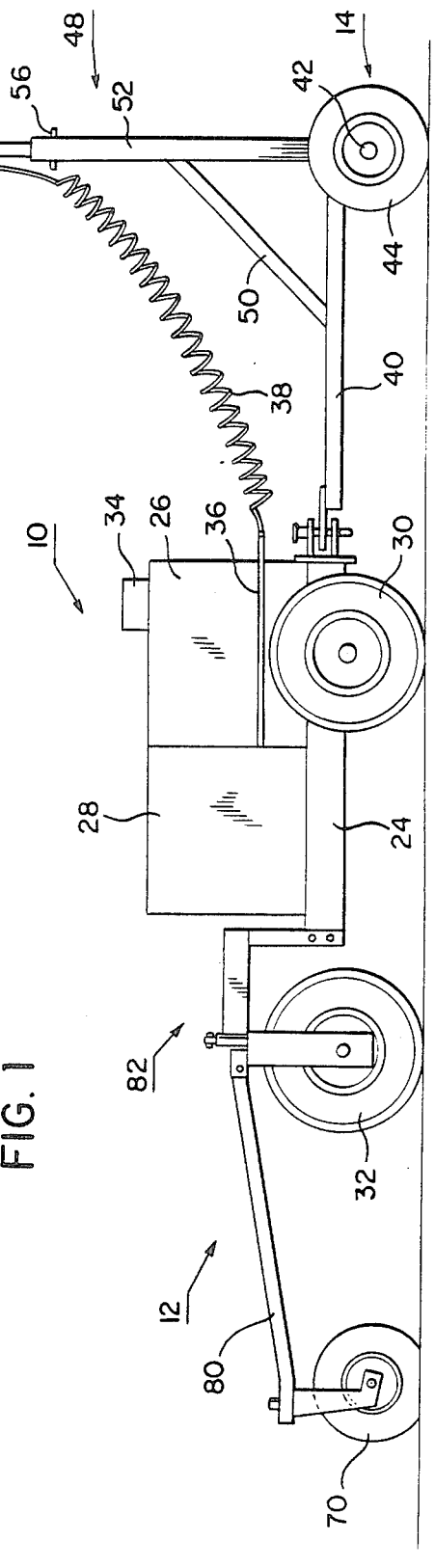
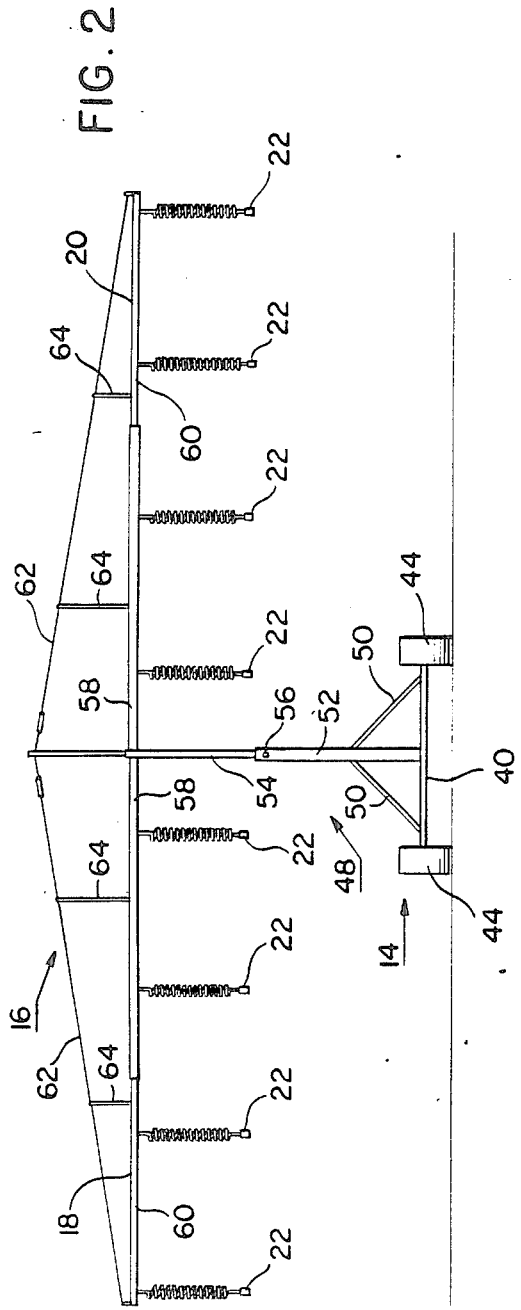

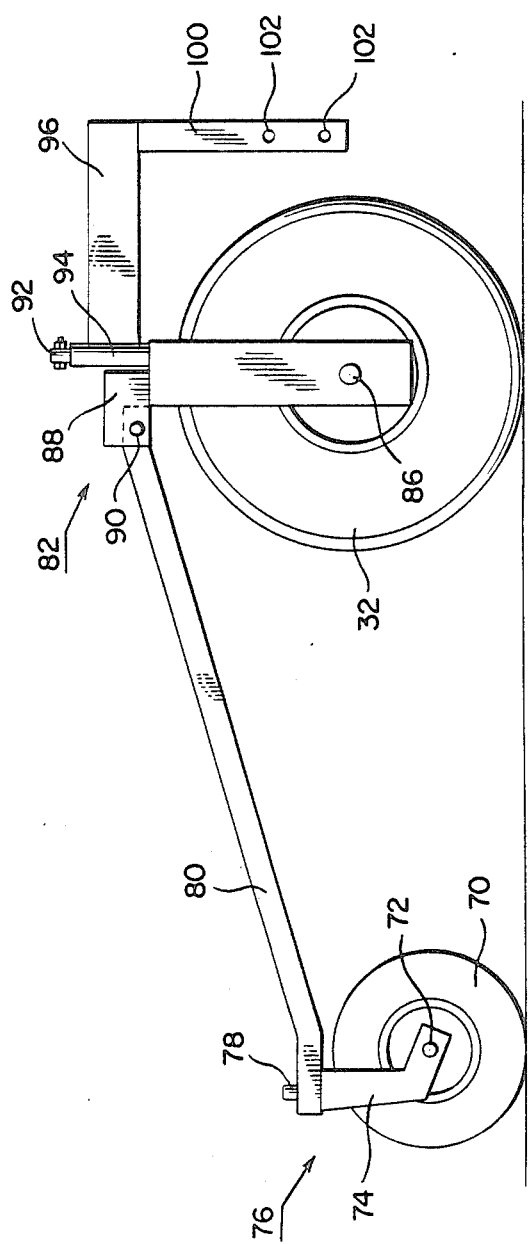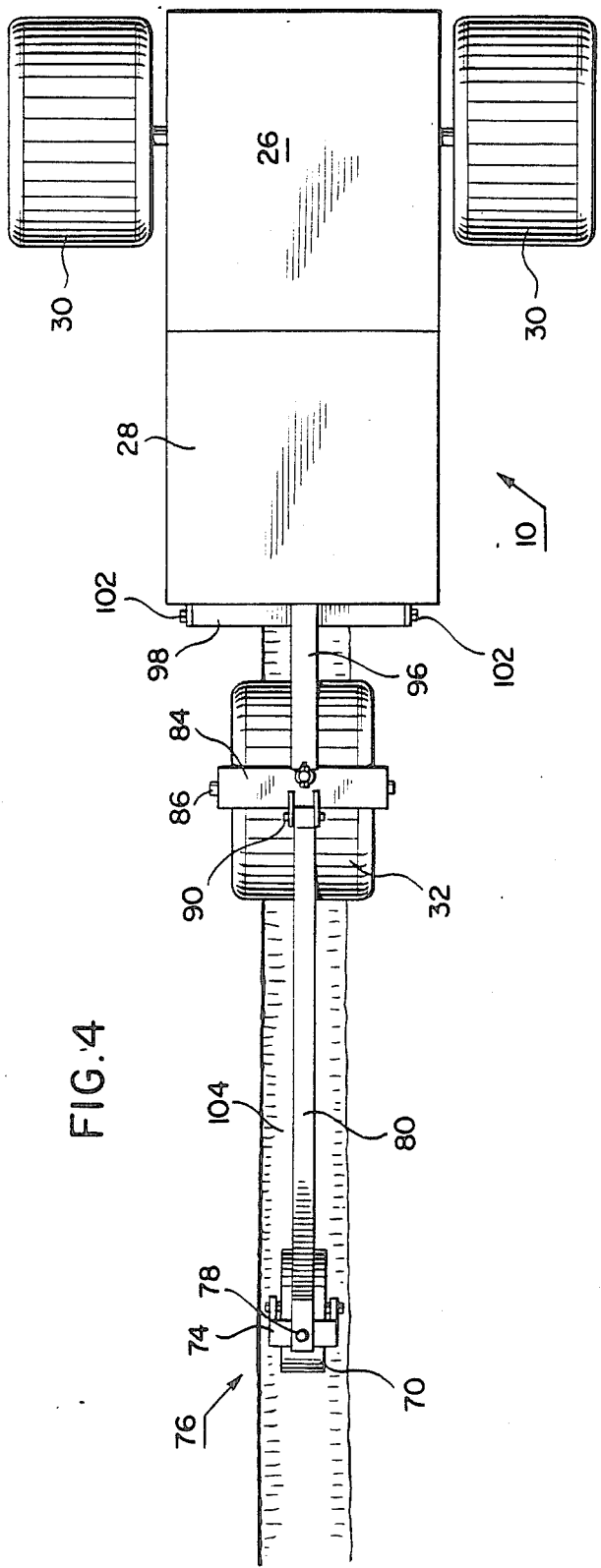

SELF-PROPELLED, SELF-STEERED VEHICLE FOR POWER DRIVEN PLANT TRIMMING TOOLS

BACKGROUND OF THE INVENTION

The present invention relates to a vehicle for providing power to a plurality of power driven plant trimming tools, and more particularly to a self-propelled, self-steered vehicle that is adapted to automatically follow a pre-formed furrow to draw a telescopic boom through a cultivated field, the boom including air lines for feeding compressed air to a plurality of manually controlled, pneumatically operated pruning devices.

DESCRIPTION OF THE PRIOR ART

Trimming of plants, vines, trees, and the like is performed to stimulate proper growth. Hand-operated pruning devices are often used to perform the trimming operations. However, the use of such manual devices is frequently tiring, and the trimming or pruning of large diameter branches is often quite difficult. Accordingly, a compressed-air-operated tree trimmer is disclosed in U.S. Pat. No. 4,347,880, which issued Sept. 7, 1982, to the inventor of the present invention. The device disclosed in that patent is a single cut trimming device that is extendable by adding a suitable number of tubes and rods.

U.S. Pat. No. 4,541,177 issued Sept. 17, 1985, to Brian Hollander, discloses a delimbing shear attachment for a movable boom mounted on a motorized or self-propelled vehicle having an operator's station, such as a cab or platform. The operator controls the movement of the boom and the application of hydraulic power to the delimbing shear attachment mounted on the end of the boom.

U.S. Pat. No. 4,411,070, issued Oct. 25, 1983, to George A. Boyum et al, discloses a tree trimming apparatus mounted on a mobile support vehicle. The apparatus includes a telescopic unit pivotally mounted on a pedestal. A large diameter circular saw is mounted at the end of the boom and is powered by a high-speed hydraulic motor to provide high cutting efficiency.

It is an object of the present invention to provide an improved, self-propelled vehicle for providing power to a plurality of manually controlled, power-operated pruning units to permit pruning to be accomplished simultaneously in a plurality of rows of plants.

SUMMARY OF THE INVENTION

Briefly stated, in accordance with one aspect of the present invention, a self-propelled, self-steered vehicle is provided for supplying power to a plurality of power driven plant trimming tools. The vehicle includes a pair of driving wheels connected with a suitable source of power, and a steerable wheel is rotatably mounted on a steered wheel carrier that is supported at a forward end of the vehicle and is pivotable about a vertical axis to effect steering of the vehicle. A source of power is driven by the engine for providing power to a plurality of powered trimming tools. Steering means is connected to the steered wheel, and includes a pilot wheel that is adapted to be received in and to travel along a pre-formed furrow in a cultivated field. The pilot wheel is rotatably mounted on a pilot wheel carrier, and lever means extends between and interconnects the steering wheel carrier and the pilot wheel carrier. The pilot wheel carrier is pivotally mounted on the lever means to pivot about a vertical axis, and the steered wheel carrier is secured to the lever means at a predetermined spacing from the pilot wheel carrier pivot axis so that lateral movement of the pilot wheel caused by variation of the direction of the furrow causes pivotal movement of the lever about a vertical axis passing through the steered wheel carrier to turn the steered wheel in the direction of the lateral movement of the pilot wheel. Carrier means are connected with the vehicle for carrying a plurality of conduits communicating with the source of power to supply power to individual plant trimming tools spaced along the carrier means in a direction transverse to the direction of motion of the vehicle.

BRIEF DESCRIPTION OF THE DRAWINGS

FIG. 1 is a side view of a self-propelled, self-steered plant trimming apparatus in accordance with the present invention.

FIG. 2 is a rear end view of the apparatus of FIG. 1, showing the structural arrangement of a carrier for supporting a plurality of connections for individual plant trimming tools.

FIG. 3 is an enlarged side view of the self-steering machanism of the vehicle illustrated in FIG. 1.

FIG. 4 is a top view of the self-steering mechanism of the vehicle illustrated in FIG. 1.

DESCRIPTION OF THE PREFERRED EMBODIMENTS

Figure 7:
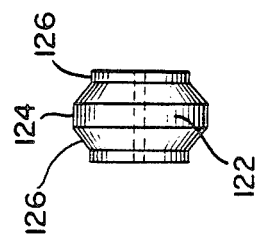
FIG. 7 is an end view of the wheel that forms a part of the furrow-forming apparatus of FIG. 5.

Referring now to the drawings, and particularly to FIGS. 1 and 2 thereof. There is shown a self-propelled vehicle 10 that includes a self-steering mechanism 12 at its forward end, and that draws a wheeled trailer 14 that carries a supporting structure 16 including a pair of laterally extending telescopic arms 18, 20 that support a plurality of connectors 22, each adapted to connect with a respective power operated trimming tool (not shown), such as a pruning device of the type disclosed in my U.S. Pat. No. 4,347,880, issued Sept. 7, 1982, the disclosure of which patent is hereby incorporated herein by reference.

Vehicle 10 includes a frame 24 that supports an engine 26 and a power source 28 to operate the trimming tools. A pair of drive wheels 30 are supported to one end of frame 24, on opposite sides thereof, and a steerable wheel 32 is provided at the opposite end of frame 24. Engine 26 can be any convenient source of rotary power to drive wheels 30, such as a gasoline or a diesel engine, and includes a throttle or speed control 34 for permitting the speed of vehicle 10 to be set at any predetermined speed value.

Power source 28 for trimming tools of the type disclosed in my U.S. Pat. No. 4,347,880 is preferably an air compressor that is driven by engine 26, and that includes a pressure outlet 36 that communicates with a coiled main conduit 38 to carry compressed air to the respective connectors 22 carried by trailer 14. Alternatively, if desired, power source 28 can be an hydraulic pump, in order to provide pressurized hydraulic fluid at the respective connectors 22 for hydraulically operated trimming tools, or power source 28 can be an electric generator driven by engine 26 for providing electrical power at connectors 22 to operate electrically powered trimming tools.

Trailer 14 includes a frame 40 that carries an axle 42 to rotatably support a pair of spaced wheels 44. Trailer 14 is suitably connected with vehicle 10 by means of a connecting pin 46, or the like, or any other suitable connection as is well known to those skilled in the art. Frame 40 supports a vertically extending boom 48, which is secured to frame 40 by braces 50. Boom 48 is a tubular structure that includes an outer tube 52 and an inner tube 54 that slidably extends within outer tube 52 to provide a telescopic structure. Outer tube 52 includes a pair of aligned openings to receive a positioning pin 56, and inner tube 54 includes a plurality of pairs of aligned openings that are spaced along the axis thereof to permit vertical adjustment and positioning of inner tube 54 with respect to outer tube 52 at a desired height, depending upon the height of the plants between which the apparatus is intended to pass.

Referring more specifically to FIG. 2, inner tube 54 carries a pair of axially aligned outwardly extending arms 18, 20 from which the respective connectors 22 extend. Arms 18 and 20 are also preferably telescopic in a manner similar to the vertical boom 48, and each arm includes an outer tube 58 secured to inner tube 54 of vertical boom 48, and an inner tube 60 that is axially slidable within outer tube 58. An aperture and pin arrangement similar to that of boom 48 is provided on arms 18 and 20 to secure the inner and outer tubes thereof in a desired position to provide the desired lateral extension. Additionally, adjustable length guy wires 62 extend from the outermost ends of the respective inner tubes 60 to the topmost end of the vertical boom inner tube 54 for additional support for arms 18 and 20. Further, intermediate supports 64 can be provided as needed, depending upon the length of the telescopic arms.

Extending downwardly from each of telescopic arms 18 and 20 are a plurality of connectors 22, that are provided at the lowermost ends of coiled branch conduits 66 supported by the telescopic arms. Coiled branch conduits 66 are preferably carried on rings (not shown), or the like, that are slidable along telescopic arms 18 and 20 to a desired position. Additionally, coiled branch conduits 66 communicate with main conduit 38 to provide a direct communication path between power source 28 and connectors 22, to thereby permit the desired number of power operated trimming tools to be attached to the device. Although in its preferred form the apparatus includes trailer 14 for supporting the respective connectors 22, it would be apparent to those skilled in the art that boom 48 and its associated connector supporting structure could also be provided on vehicle 10 itself, if desired.

Referring now to FIGS. 3 and 4, the self-steering mechanism 12 of vehicle 10 includes a pilot wheel 70 that is rotatably carried on an axle 72 supported in a generally horizontal orientation in a pilot wheel yoke 74. Axle 72 and yoke 74 define a pilot wheel carrier 76. Yoke 74 includes a vertically extending pivot shaft 78 that is rotatably received in an opening formed in a steering lever 80. Thus it is apparent that pilot wheel carrier 76 is pivotable with respect to the steering lever about the axis of pivot shaft 78. Steering lever 80 is also connected with a steered wheel carrier 82 that includes a steering wheel yoke 84 that rotatably carries steered wheel 32 on an axle 86. Steering wheel yoke 84 carries a bracket 88 that supports a horizontally extending pin 90 to define a horizontal pivot about which steering lever 80 can pivot.

Steering wheel yoke 84 also carries a vertically extending shaft 92 spaced rearwardly of pin 90, and is rotatably received in a vertically extending sleeve 94 that is secured to one end of a horizontal connecting bar 96. The opposite end of the connecting bar 96 is secured to a transversely extending connecting bar 98 at a point between its ends. Vertical connecting bars 100 extend downwardly from the ends of bars 98 for attachment to vehicle frame 10 by means of bolts 102, or the like.

Pilot wheel 70 is preferably of a diameter of about ten inches or less, and of a width of about 3 inches, in order to permit it to run within a pre-formed furrow 104 (see FIG. 4). Steered wheel 32 is preferably larger than pilot wheel 70, both in diameter and in width, and can have a diameter of about 18 inches, and a width of from about 7 to about 10 inches. Because of the different wheel diameters and the fact that steered wheel 32 has a larger diameter, steering lever 80 extends forwardly and downwardly from steered wheel carrier 82. The axial length of steering lever 80 can be on the order of about 72 inches. Thus pilot wheel 70 follows furrow 104, and because of its pivotal connection with steering lever 80, pilot wheel 70 causes steering lever 80 to pivot transversely about the axis of shaft 92 as furrow 104 shifts transversely, and thereby causes steered wheel 32 to follow any such deviations in the furrow.

Figure 6:
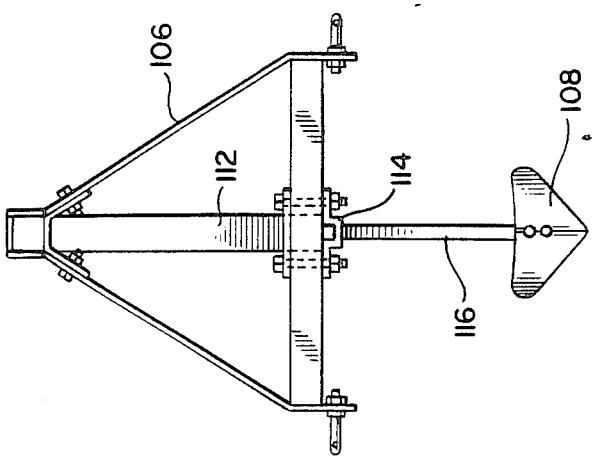
FIG. 6 is a front end view of the apparatus of FIG. 5.
Figure 5:
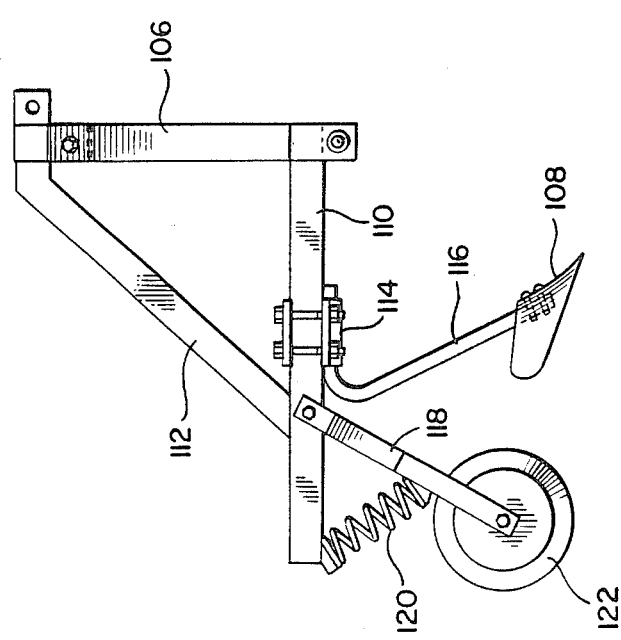
FIG. 5 is an elevational view showing one form of furrow-forming apparatus for providing a pre-formed furrow for use with the present invention.

One form of apparatus for providing pre-formed furrow 104 is illustrated in FIGS. 5 through 7. The apparatus includes a triangular plowshare frame 106 that is adapted to be hooked to a three point hitch tractor, in order to permit plowshare 108 to be pulled through a field, orchard, or vineyard to form the desired furrow. Triangular frame 106 is connected with a horizontally extending beam 110, which is braced by a beam support member 112. Extending downwardly from beam 110 and secured thereto by a bolted clamp 114 is a plowshare carrier 116, at the lower end of which plowshare 108 is secured by means of bolts, or the like. Spaced along beam 110 from plowshare carrier 116, and on the side opposite to triangular frame 106 is a wheel carrier 118 that is pivotally connected to beam 110 and that includes a coil spring 120 to urge plowshare wheel 122 in a downward direction. Wheel 122 is rotatably carried by wheel carrier 118, and preferably has a cross-sectional shape that includes a flat central portion 124 and tapered side portions 126 as illustrated in FIG. 7. Thus, because of its cross section, wheel 122 shapes furrow 104 in the desired form, and in a way to permit pilot wheel 70 to properly follow along the furrow.

In operation, support structure 16 for connectors 22 is set at the desired height and lateral extension, depending upon the height and spacing of the plants that are intended to be trimmed, and the number of furrows in which simultaneous trimming is intended to be effected. After a furrow 104 has been formed, engine 26 of vehicle 10 is started, and speed control 34 is set for the desired vehicle forward speed. Pilot wheel 70 is positioned so that it is received in and follows furrow 104.

The start-up of engine 26 drives an air compressor, as power source 28 for the trimming tools, to provide compressed air to the several connectors 22 that depend from telescopic arms 18 and 20. The operators of the respective trimming tools can connect their tools to the connectors 22, and can perform the necessary trimming operations as the vehicle proceeds at the desired speed, and without operator attention, along the furrow. As earlier noted, pilot wheel 70 follows any transverse deviations of the furrow to cause vehicle 10, through steering lever 80 and steered wheel 32, to be steered in such a way that it follows the entire length of the furrow automatically, and while unattended. When the length of the furrow has been traversed, the apparatus can be directed to another furrow by raising the pilot wheel and manually pivoting steering lever 80 about the axis of shaft 92 until the vehicle is aligned with the next furrow, whereupon the pilot wheel is placed in that furrow and the operation is repeated until the entire field, orchard, or vineyard has been trimmed.

Although particular embodiments of the present invention have been illustrated and described, it will be apparent to those skilled in the art that various changes and modifications can be made without departing from the spirit of the present invention. It is therefore intended to encompass in the appended claims all such changes and modifications that fall within the scope of the present invention.

What is claimed is:

1. A self-propelled, self-steered vehicle for supplying power to a plurality of power driven plant trimming tools, comprising:
    (a) a wheeled vehicle having a pair of driving wheels, a steered wheel rotatably mounted on a steered wheel carrier, said steering wheel carrier mounted at one end of the vehicle and pivotal about a vertical axis, an engine supported by the vehicle and drivingly connected with the driving wheels for propelling the vehicle along the ground, speed control means for controlling the speed of the vehicle, and a tool power source driven by the engine for providing power to a plurality of plant trimming tools;
    (b) steering means connected to the steered wheel, said steering means including a pilot wheel adapted to be received in and to travel along a pre-formed furrow in a field, said pilot wheel rotatably mounted on a pilot wheel carrier, and lever means extending between and interconnecting the steered wheel carrier and the pilot wheel carrier, said pilot wheel carrier being pivotally connected to said lever means to pivot about a vertical axis, said steered wheel carrier secured to said lever means at a predetermined spacing from said pilot wheel carrier, wherein lateral movement of said pilot wheel causes pivotal movement of said lever about a vertical axis passing through said steered wheel carrier to turn said steered wheel in the direction of said lateral pilot wheel movement; and
    (c) carrier means connected with said vehicle for carrying a plurality of conduits communicating with said tool power source to supply power to a plurality of individual plant trimming tools connected to the conduits, the carrier means including a supporting structure, and conduit means carried by the supporting structure and in communication with the tool power source, the conduit means terminating in a plurality of connectors to which plant trimming tools are adapted to be connected, the supporting structure including a central, upstanding boom, the boom carrying a pair of outwardly extending arms each supporting at least one branch conduit and connector.

2. A vehicle as claimed in claim 1, wherein the boom is telescopic for permitting vertical adjustment of the positions of the arms.

3. A vehicle as claimed in claim 1, wherein the arms are telescopic for lateral adjustment of the positions of the branch conduits.

4. A vehicle as claimed in claim 1, wherein the carrier means is supported on a trailor detachably connected with the vehicle at an end opposite to an end at which the steered wheel is mounted, and the trailor adapted to be drawn by the vehicle.

5. A vehicle as claimed in claim 1, wherein the tool power source includes compressor means for providing a pressurized gas for operating pneumatic trimming tools.

6. A vehicle as claimed in claim 5, wherein the compressor means is drivingly connected with the engine.

7. A vehicle as claimed in claim 1, wherein the plant trimming tools are fluid pressure operated cutting devices.

8. A vehicle as claimed in claim 1, wherein the pilot wheel has a smaller diameter than the diameter of the steered wheel.

9. A vehicle as claimed in claim 1, wherein the pilot wheel has a narrow width than the width of the steered wheel.

10. A vehicle as claimed in claim 1, wherein the steered wheel is rotatably carried on a steered wheel yoke and the lever means is pivotally connected to the steered wheel yoke for pivotal movement about a substantially horizontal axis.

11. A vehicle as claimed in claim 10, wherein the steered wheel yoke is pivotally carried by a connecting means secured to the vehicle.

* * * * *